United States Patent [19]
Janik

[11] Patent Number: 6,048,455
[45] Date of Patent: *Apr. 11, 2000

[54] FILTER ASSEMBLY WITH CONFORMAL CARTRIDGE SUPPORT STRUCTURE

[75] Inventor: Leon P. Janik, Suffield, Conn.

[73] Assignee: Stanadyne Automotive Corp., Windsor, Conn.

[*] Notice: This patent is subject to a terminal disclaimer.

[21] Appl. No.: 08/918,608

[22] Filed: Aug. 22, 1997

Related U.S. Application Data

[60] Provisional application No. 60/023,431, Aug. 22, 1996.

[51] Int. Cl.$^7$ .................................................. B01D 35/30
[52] U.S. Cl. ........................... 210/232; 210/438; 210/440; 210/444
[58] Field of Search ...................................... 210/232, 233, 210/435, 443, 444, 455, 453, DIG. 17, 437–440

[56] References Cited

U.S. PATENT DOCUMENTS

| | | | |
|---|---|---|---|
| 2,888,141 | 5/1959 | Coates et al. | 210/DIG. 17 |
| 3,727,764 | 4/1973 | Ogden | 210/444 |
| 4,818,396 | 4/1989 | Wolf | 210/232 |
| 4,857,195 | 8/1989 | Brownell et al. | |
| 5,837,137 | 11/1998 | Janik | 210/232 |

FOREIGN PATENT DOCUMENTS

| | | |
|---|---|---|
| 0 270 303 | 6/1988 | European Pat. Off. . |
| 0 442 365 A2 | 8/1991 | European Pat. Off. . |
| WO 95/11072 | 4/1995 | WIPO . |

*Primary Examiner*—Matthew O. Savage
*Attorney, Agent, or Firm*—Alix, Yale & Ristas, LLP

[57] ABSTRACT

A filter assembly including a base and a disposable filter cartridge. The container of the filter cartridge has a top portion of an upper section that is received in the base and which may deform into engagement with the interior receiving surface of the base when exposed to the fuel system operating pressure. A plurality of longitudinally extending keys or protrusions protrude from the bottom surface of the base. The protrusions are selectively dimensioned and positioned to provide a unique protrusion matrix for a given filter capacity, filtering quality or filtering parameter. The protrusions form corresponding depressions in the top portion of the upper section when the fuel system is operating, locking the top portion of the upper section to the base. The base structure supports the upper section of the cartridge, controlling the extent of deformation of the upper section.

17 Claims, 7 Drawing Sheets

FILTER ASSEMBLY WITH CONFORMAL CARTRIDGE SUPPORT STRUCTURE

CROSS-REFERENCE TO RELATED APPLICATION

This application claims priority from U.S. Provisional Application Ser. No. 60/023,431 filed on Aug. 22, 1996.

BACKGROUND OF THE INVENTION

This invention relates generally to fuel filters employed in connection with internal combustion engines. More particularly, the present invention relates to fuel filters and lubricating oil filters having a replaceable cartridge for removing foreign particles and/or separating water from the fuel supply or oil system of an internal combustion engine.

Commonly, filters employ a disposable filter cartridge which is replaced at pre-established intervals of filter usage. The cartridge is secured to a base assembly that is mounted to the engine header or some other fixed location. Fuel systems utilize various pump arrangements to transport the fuel through the system, thereby internally pressurizing portions of the fuel system. Conventional fuel systems generally expose the fuel filter cartridge to an internal pressure of up to 30 psi. Light gauge steel may therefore be used in the manufacture of filter cartridge housings for such conventional systems. However, fuel systems currently under development will expose the fuel filter cartridge to internal pressures of greater than 50 psi. Such pressures may result in deformation of conventional cartridge housings resulting in rupture of the housing or failure of the cartridge-to-base seal.

SUMMARY OF THE INVENTION

Briefly stated, the invention in a preferred form is a fuel filter assembly which comprises a base and a disposable filter cartridge. The filter cartridge includes a cartridge container having an upper section that is received in the base. The upper section is composed of material having a thickness and mechanical properties and a quasi-conformal configuration such that the force exerted on the interior surface of the cartridge container by operating pressure, such as, for example, greater than 50 psi, may plastically deform the exterior surface of the upper section into a more conformal engagement with the interior receiving surface of the base.

In one embodiment a plurality of longitudinally extending keys or protrusions protrude from the bottom surface of the base. The protrusions are selectively dimensioned and positioned to provide a unique protrusion matrix for a given filter capacity, filtering quality or filtering parameter. At operating pressure, the top portion of the upper section is forced into a closer conformation with the lower receiving surface of the base which also functions to provide a support. Consequently, the protrusions form corresponding complementary depressions in the top portion of the upper section. Such engagement locks the top portion of the upper section to the base, preventing rotation therebetween when the fuel system is operating.

The configuration of the base is selected such that the base supports the upper section of the container, preventing further deformation of the upper section. Consequently, the filter cartridge container does not require stand-alone pressure vessel design considerations to withstand the forces exerted by the relatively high fuel pressure. The height of the protrusions and the clearance between the receiving surface of the base and the opposing portion of the cartridge section are selected to ensure that the formed depressions and the protrusions have sufficient engagement to lock the cartridge in the base. The protrusions are spaced such that the complementary depressions are distinct and do not overlap. Such configuration provides a superior locking mechanism, preventing slippage between the cartridge and the base.

An object of the invention is to provide a new and improved fuel filter system which employs a filter cartridge having an efficient and low cost construction and is capable of operating at high internal operating pressures.

Another object of the invention is to provide a new and improved location and key system for a fuel filter system that utilizes the fuel pressure or pressure cycles to form in a post-installation process a more conformal complementary structure that receives the key.

A further object of the invention is to provide a new and improved location and key system for locking the cartridge to the base and thereby preventing rotation therebetween.

Other objects and advantages of the invention will become apparent from the drawings and the specification.

BRIEF DESCRIPTION OF THE DRAWING

The present invention may be better understood and its numerous objects and advantages will become apparent to those skilled in the art by reference to the accompanying drawing in which.

DETAILED DESCRIPTION OF THE PREFERRED EMBODIMENT

Figure 1:
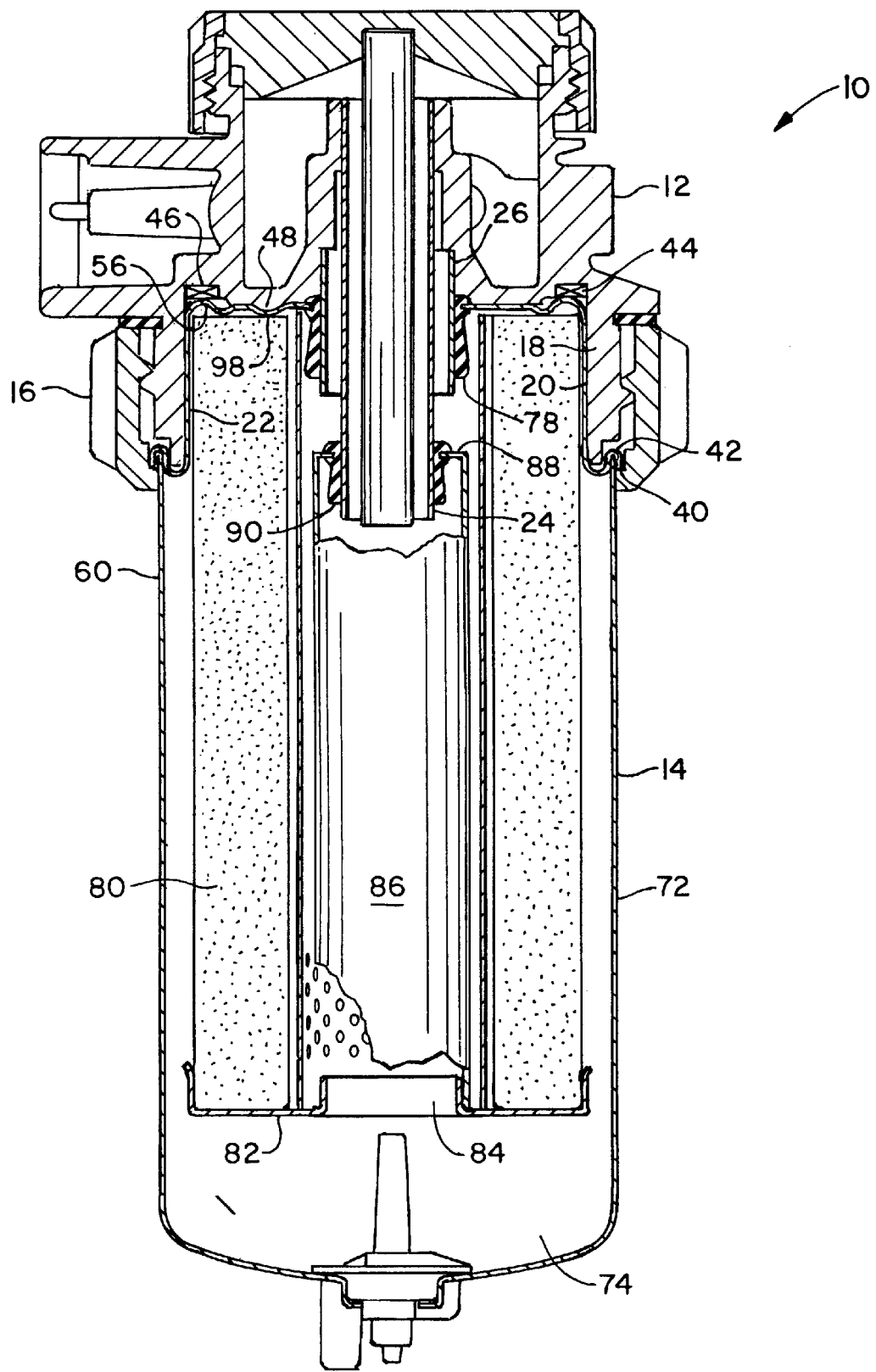
FIG. 1 is a sectional elevational view, partly broken away, of a fuel filter assembly in accordance with the invention.

With reference to the drawings wherein like numerals represent like parts throughout the several figures, a fuel filter assembly in accordance with the present invention is generally designated by the numeral 10. Fuel filter assembly 10 comprises a base 12 and a disposable filter cartridge 14. The base 12 is disposed generally above the disposable filter cartridge 14 which is locked to the base 12 by means of a retainer collar 16. Alternatively, the base and filter cartridge may be inverted wherein the filter cartridge is disposed above the base. The fuel filter assembly 10 is especially adapted for incorporation into the fuel supply system of an internal combustion engine (not illustrated), such as a diesel engine, for removing particulate matter from fuel and separating the water from the fuel. Filters of this type may also be used to filter impurities from oil in the lubricating system of an internal combustion engine or for other filter applications.

The base 12 and the disposable cartridge 14 may assume a wide variety of configurations. For the disclosed embodiment, the base 12 is an inverted cup-like receptacle which forms a skirt 18 defining a lower receptacle cavity 20 for upper portions 22 of the disposable cartridge 14. An elongated sleeve-like first conduit 24 and an outer concentric sleeve-like second conduit 26 provide generally co-axial fluid communication between the base 12 and the disposable cartridge 14.

Figure 3:
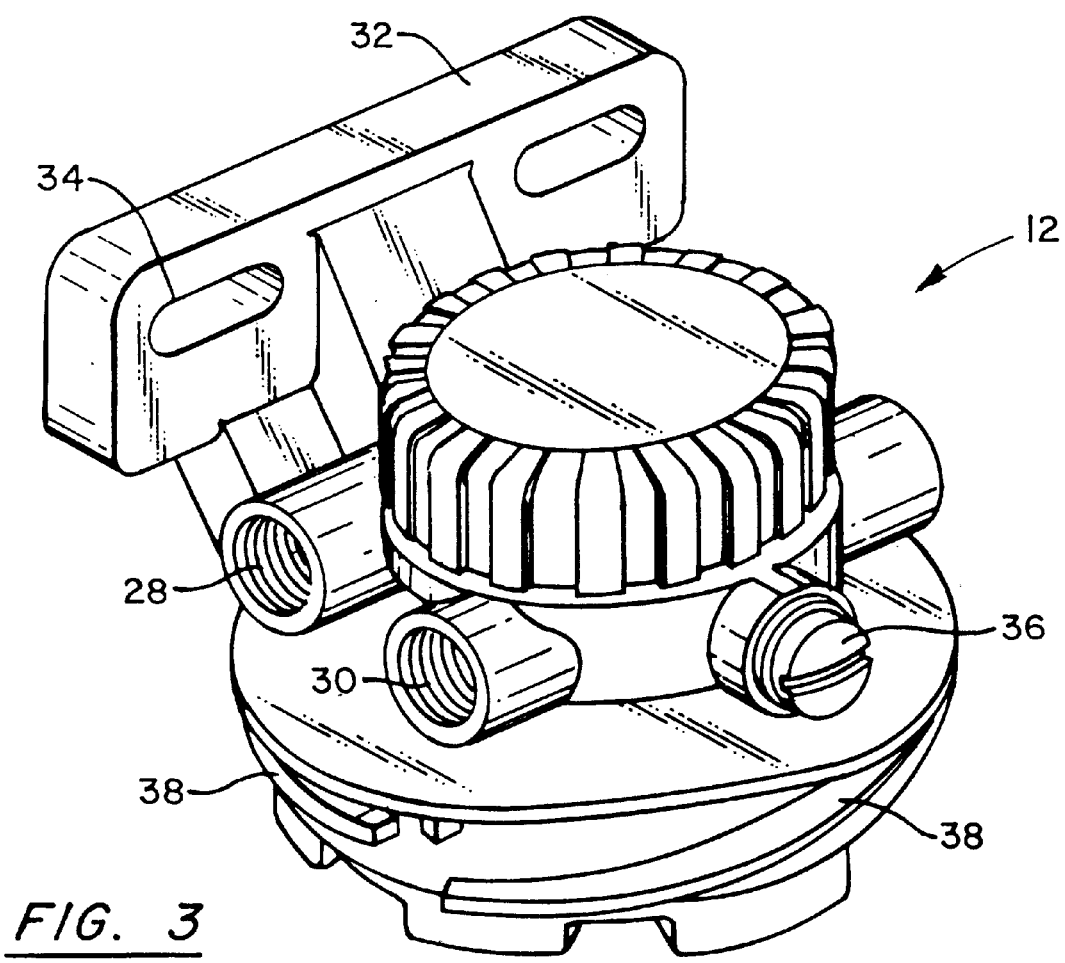
FIG. 3 is an enlarged perspective view of the base portion of the fuel filter assembly of FIG. 1.
Figure 4:
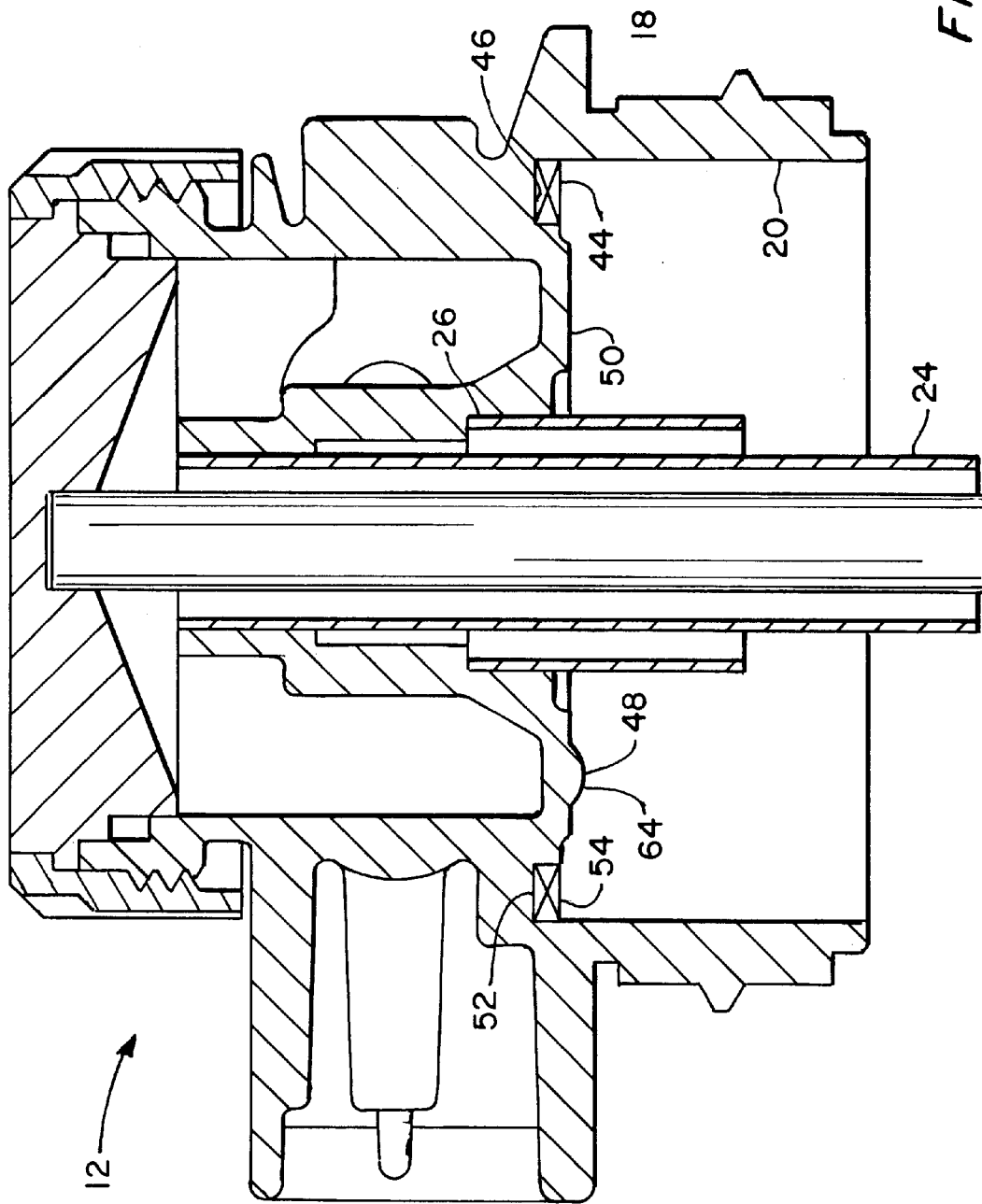
FIG. 4 is an enlarged sectional view of the base portion of the fuel filter assembly of FIG. 1.

With reference to FIG. 3, an inlet connector 28 at an upper side location of the base 12 connects with the fuel line (not illustrated) to ultimately provide fluid communication through the interior passageway defined by the first conduit 24. An outlet connector 30 at an upper side location of the base 12 connects with the fuel line to provide external fluid communication from the axial fluid conduit defined between the first and second conduits 24, 26. An integral projecting bracket 32 which may include a pair of openings 34 for anchoring the filter base 12 to the engine extends transversely from the base 12. The base 12 may also have an external air vent 36.

The base 12 may include a pair of integral outwardly projecting diametrically opposed ramps 38 which ascend in spiral-like fashion around the base 12. The upper ends of the ramps 38 are beveled. The collar 16 includes a pair of diametrically disposed spiral followers (not shown) which integrally extend inwardly from the collar 16. The followers are dimensioned and positioned for engagement with the ramps 38 so that the followers slidably engage and ascend the ramps 38 upon alignment and angular rotation of the collar 16. The collar 16 includes an inwardly projecting annular shoulder 40 which engages the roll seam 42 of the cartridge 14 for releasably locking the cartridge 14 to the base 12.

Figure 2:
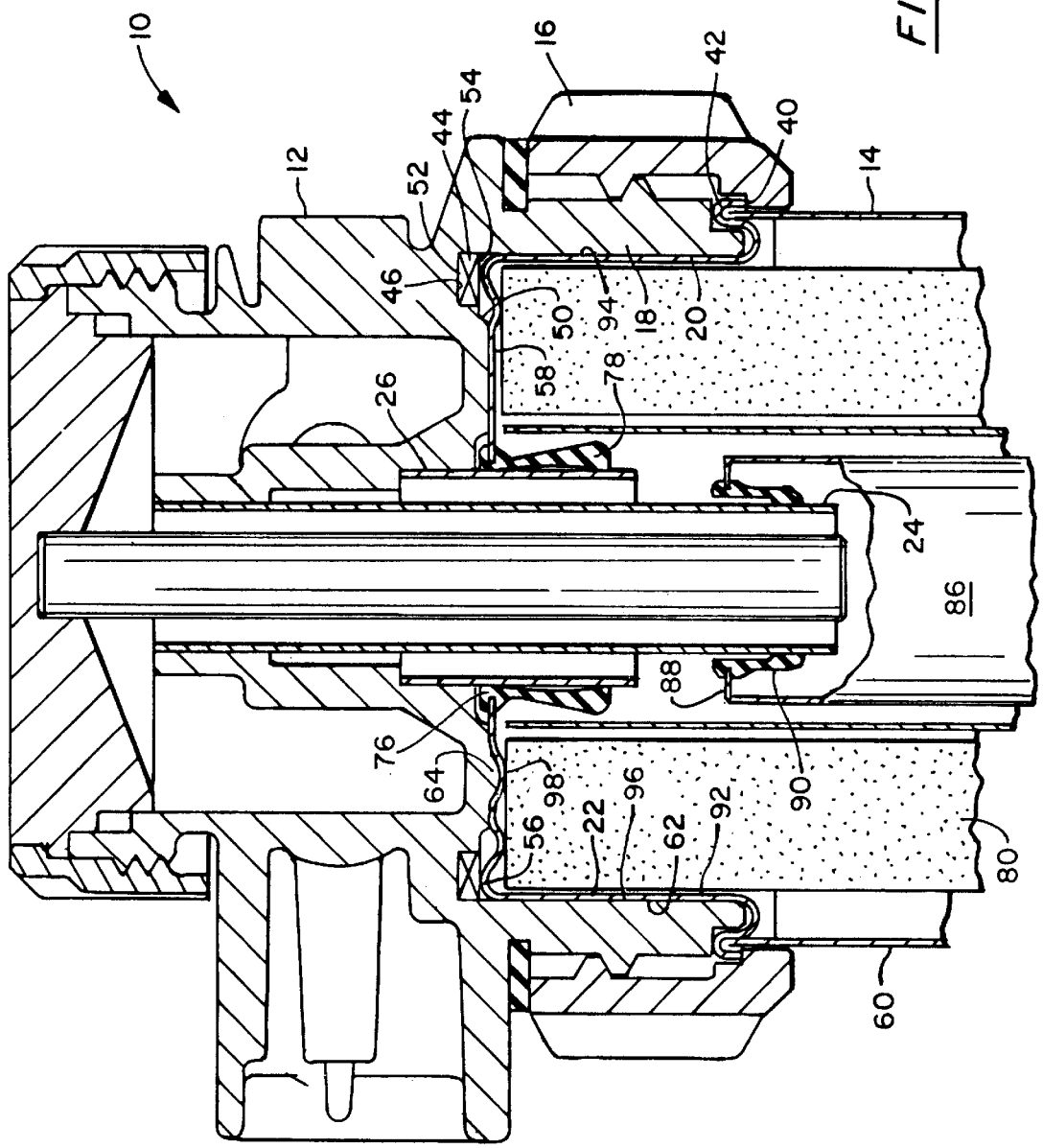
FIG. 2 is an enlarged fragmentary sectional view, partly in schematic, of the fuel filter assembly of FIG. 1.

With reference to FIGS. 1 and 2, a locking force is releasably maintained by the force of a spring 44 which is retained in an annular recess 46 in the base 12. The recess 46 is positioned adjacent the skirt 18 of the base 12. Some conventional filter assemblies include a spring for providing a locking force. Typically, such springs are positioned closer to the axis of the filter base/cartridge than the spring 44 of the subject invention. Springs 44 located closer to the periphery of the filter base/cartridge may provide greater stability than do springs located closer to the axis. In addition such location allows room for key/locating protrusions 48 that protrude downwardly from the lower surface 50 of the base 12. A preferred embodiment is a wave spring having an upper surface 52 that abuts the surface of the recess 46 and a lower surface 54 that engages an annular ridge 56 on the top portion 58 of the upper section 62 of the filter cartridge enclosure 60. The spring 44 functions to substantially uniformly distribute the load between the base 12 and the filter cartridge 14.

Figure 5:
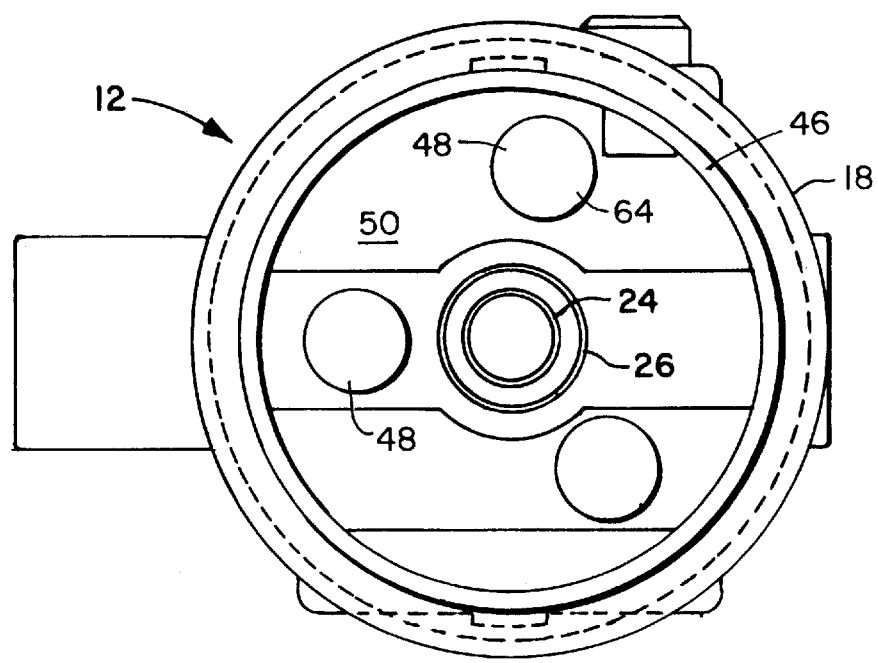
FIG. 5 is an enlarged bottom plan view of the base portion of the fuel filter assembly of FIG. 1.
Figure 6A:
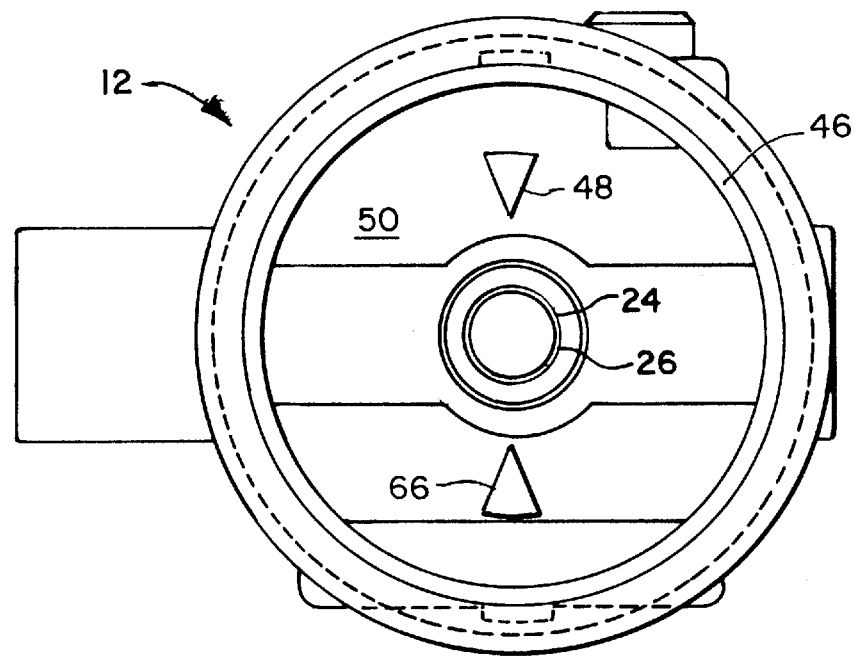
FIGS. 6a, 6b and 6c are enlarged bottom plan views of the base portion of the fuel filter assembly of FIG. 1 showing an alternate embodiment of a locking protrusion.
Figure 6B:
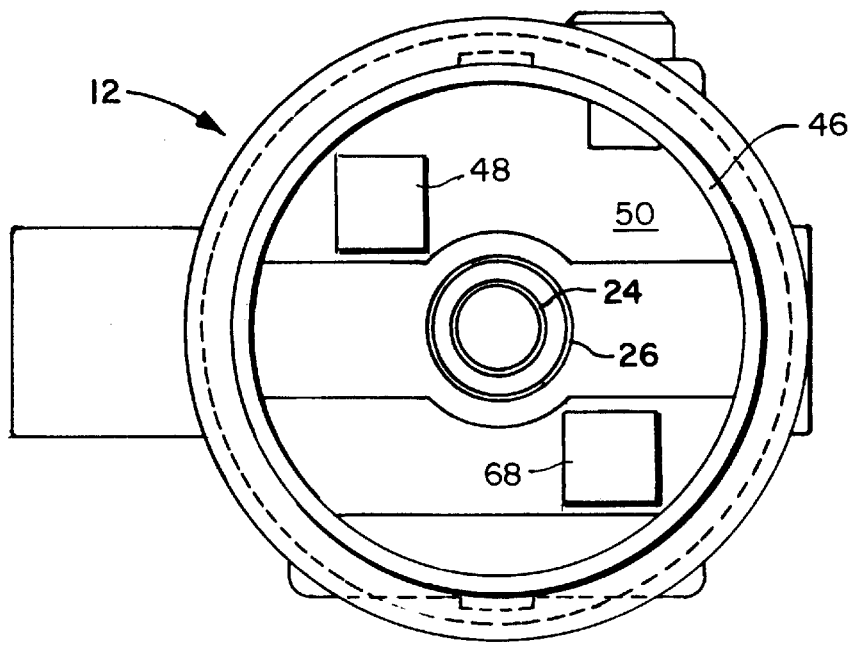
Figure 6C:
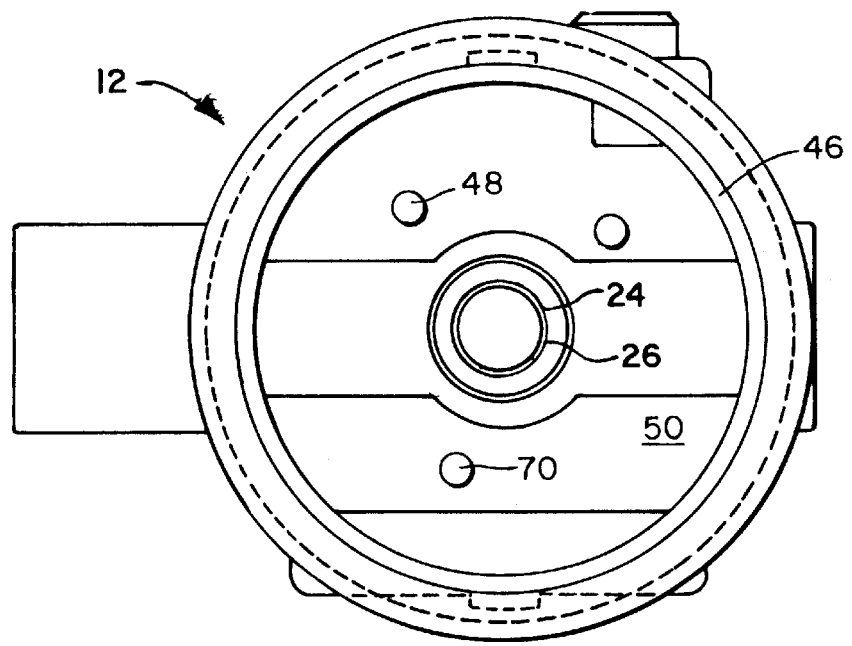

A key system is employed to lock the cartridge 14 to the base 12 and thereby prevent rotation therebetween. In a preferred form, a plurality of longitudinally extending keys or protrusions 48 protrude from the bottom surface 50 of the base 12 intermediate the recess 46 and the second conduit 26. Preferably, the protrusions 48 are disposed substantially equidistantly between the second conduit 26 and the recess 46. The protrusions may have the shape of a spherical sector cap 64, a pie wedge-shape 66, a square-shape 68, a bead or bump 70, or other non-spherical shape, as shown in FIGS. 4, 5 and 6a–6c. For filter assemblies 10 which require a positioning and/or locking system but that do not require a key system, the protrusions 48 may be spaced substantially 120° apart, as shown in FIG. 5.

Figure 7:
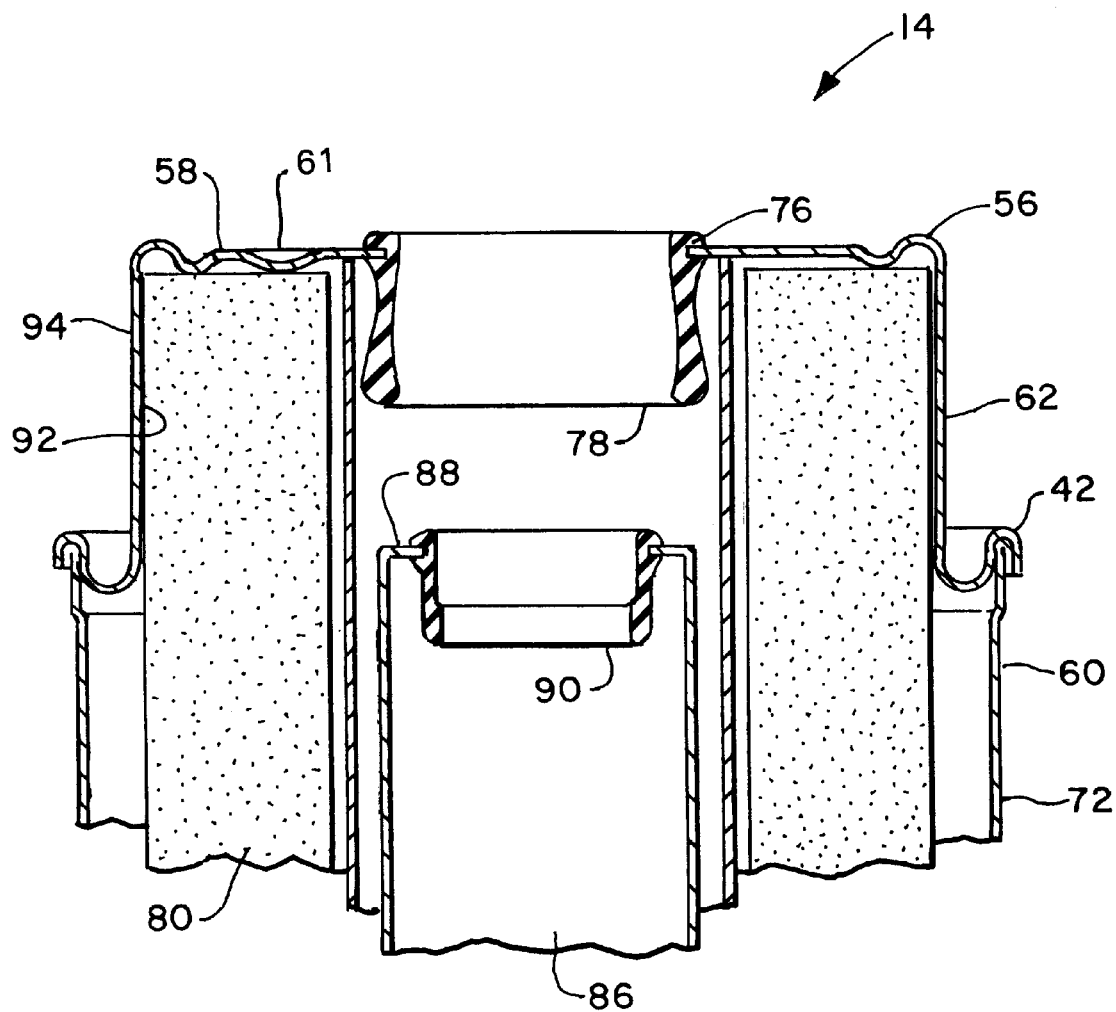
FIG. 7 is an enlarged fragmentary sectional view of the filter cartridge of FIG. 1 in a pre-installation configuration.

With reference to FIGS. 1 and 2, the disposable filter cartridge 14 comprises a can-like enclosure 60 formed by a pair of opposed lower and upper cup-like sections 72, 62. The sections 62, 72 are joined along a circumferential roll seam 42. A sump 74 is formed at the bottom of the lower section 72 to collect water which coalesces from the fuel. The upper section 62, which is smaller in diameter than the lower section 72, is received by the base receptacle 20. The upper section 62 is dimensioned to be closely accommodated in the base receptacle 20. As explained below, the top portion 58 of the cartridge may deform from the pre-installation configuration of FIG. 7 to the installed configuration of FIGS. 1 and 2 under the force of the internal operating pressures or the cyclical pressure changes within the cartridge. The pre-installation configuration may have a quasi-conformal shape in relation to the adjacent receiving/ structure of the base. A central axial opening 76 in the upper section 62 is dimensioned to receive the conduits 24, 26. A sealing grommet 78 mounted at the opening 76 diametrally fluidically seals against the outer conduit 26.

The cartridge 14 may employ a dual stage filter assembly or a single stage assembly as illustrated in FIGS. 1 and 2. A filter element 80 which has a continuous fan-shaped pleated configuration is mounted in the enclosure 60. The lower end of the element 80 is engaged by a medial plate 82 having a central opening 84. A tubular conduit 86 extends upward from the medial plate 82. The tubular conduit 86 upper end defines a flange 88. A second sealing grommet 90 mounted to the flange 88 receives and diametrally seals against the lower end of the base first conduit 24.

The upper section 62 of the filter cartridge enclosure 60 is preferably composed of drawn quality steel having a thickness of 0.018 to 0.024 inches. When the filter cartridge 14 is at operating pressure, the force exerted on the interior surface 92 (FIGS. 2 and 7) of the enclosure 60 may plastically deform the upper section 62 of the enclosure 60, forcing the exterior surface 94 of the upper section 62 into a closer conformal engagement with the interior receiving surface 96 of the base 12. The configuration of the base 12 is selected such that the base 12 reinforces the upper section 62 of the enclosure 60, preventing further deformation of the upper section 62 and providing an efficient pressure vessel-type wall structure. For example, the base 12 is preferably die cast aluminum A380 material to provide sufficient mechanical strength to support the cartridge 14 and withstand the internal operating pressures within the cartridge. It should be appreciated that the upper section 62 of the enclosure 60 functions primarily as a membrane to contain the fluid, since the base 12 provides the mechanical support to withstand the pressure force.

The top portion 58 of the upper section 62 may be pre-formed in a quasi-conformal configuration with the base and is forced into closer conformation with the lower surface 50 of the base 12 when the filter cartridge 14 is at operating pressure or as a result of the numerous pressure changes during the operational life of the cartridge. The pre-installation quasi-conformal configuration includes depressions which correspond in angular and radial positioning to the protrusions 48. Consequently, the three protrusions 48 which project from the lower surface 50 of the base 12 form corresponding depressions or dimples 98 in the upper surface 61 of the top portion 58 of the upper section 62. In comparison to the pre-installed state, these depressions or dimples are more closely conformed to the protrusions during the operation of the filter because of the pressure induced forces produced within the cartridge. Such conformal engagement locks the top portion 58 of the upper section 62 to the base 12, preventing rotation of therebetween when the fuel system is operating. It should be appreciated that the spring 44 performs no function when the fuel system is at operating pressure.

Preferably, the protrusions 48 project at least 0.150 inches from the lower surface 50 of the base 12 and the clearance between the lower surface 50 of the base 12 and the top portion 58 of the upper section 62 when the filter assembly is not pressurized is 0.010 to 0.020 inches to ensure that the dimple 98 and the protrusion 48 have sufficient engagement to lock the cartridge 14 in the base 12.

Preferably, the protrusions 48 on the base are spaced such that dimples 98 formed in the top portion 58 of the upper section 62 are well-defined, distinct and do not overlap. Such configuration provides a superior and efficient locking mechanism which at least partially exploits the operating pressure within the cartridge to enhance the locking. In one embodiment, each protrusion 64 has a diameter in the range of 0.150 to 0.750 inches to ensure sufficient engagement between the filter cartridge and the base. Such protrusions 64 may be axially spaced apart a sufficient distance to provide the proper separation between the dimples 98 formed in the top portion 58 of the upper section 62. It should be appreciated that the diameter of the protrusions 64 are in part determined by the diameter of the cartridge 14. Where larger protrusions 64 are used, the axis of each protrusion 64 may have to be radially spaced from the axis of the adjacent protrusions 64 to provide proper separation between the dimples 98 formed in the top portion 58 of the upper section 62.

The fuel enters the fuel filter assembly 10 through the fuel inlet passage 28 and exits the filter through the outlet passage 30. It will be appreciated that the fuel flow path initially axially traverses through the interior of the inner conduit 24. The circulation path extends generally axially upwardly and generally radially through the filter element 80 with the return flow path traversing between the inner conduit 24 and the outer conduit 26.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention. For example, the lower surface of the base may include one or more recesses which receive a deformable protrusion formed in the top portion of the filter cartridge by the operating pressure of the fuel.

What is claimed is:

1. A filter assembly for filtering a flow of liquid at an operating pressure of greater than 50 psi, said filter assembly comprising:
   a base defining a reference receptacle structure, said reference receptacle structure surrounding a central axis and having an engagement surface disposed entirely within said receptacle structure, said engagement surface comprising at least one protrusion extending outwardly from said engagement surface for at least 0.150 inches, wherein said protrusion is radially spaced apart from said central axis and does not entirely surround said central axis; and
   a filter cartridge having at one end portion thereof a reference container structure configured for reception within said receptacle structure, said one end portion comprising an end surface positioned adjacent said engagement surface when said filter cartridge is mounted to said base, said container structure being at least semi-flexible wherein said container structure plastically deforms due to pressure induced forces of liquid within said cartridge, so that upon mounting said cartridge to said base, said container structure is drawn into a closer conformal relationship to said receptacle structure during operation;
   wherein said end surface of said cartridge more closely conforms to said protrusion to prevent rotation of the end surface of said filter cartridge about said central axis with respect to said engagement surface.

2. The filter assembly of claim 1 wherein said engagement surface of said base comprises three protrusions that are circumferentially spaced about said central axis and which extend outwardly from said engagement surface, wherein said end surface of said cartridge more closely conforms to said protrusions upon introduction of liquid at said operating pressure into said cartridge.

3. The filter assembly of claim 2 wherein said end surface conforms to said protrusions to define three dimples, each of said dimples being distinct from each other of said dimples.

4. The filter assembly of claim 1 wherein said base comprises a skirt portion which defines said receptacle structure.

5. The filter assembly of claim 4 wherein said engagement surface is disposed within said skirt portion, said skirt portion extending from said engagement surface, said engagement surface comprising an annular recess disposed adjacent said skirt portion.

6. The filter assembly of claim 5 wherein said base further comprises spring means for biasing said cartridge, said spring means being at least partially disposed in said recess.

7. The filter assembly of claim 6 wherein said one end portion comprises an end surface and said spring means comprises a wave spring having oppositely disposed first and second surfaces, said first surface of said wave spring bearing on said engagement surface of said base and said second surface of said wave spring bearing on said end surface of said one end portion.

8. A fuel filter assembly for filtering a flow of fuel at an operating pressure of at least 50 psi, said filter assembly comprising:
   a base comprising an engagement surface and a skirt surrounding a central axis and a receptacle having an interior surface, said engagement surface being disposed entirely within said receptacle and at least one protrusion that extends outwardly from said engagement surface for at least 0.150 inches, wherein said protrusion is radially spaced apart from said central axis and does not entirely surround said central axis; and
   a filter cartridge comprising an end portion configured for reception within said receptacle, said end portion having an end surface and an outer peripheral surface and being plastically deformable due to pressure induced forces of the flow of fuel;
   wherein upon mounting said filter cartridge to said base and upon circulating fuel at operating pressure, said end surface and said peripheral surface of said end portion are drawn into engagement with said engagement surface of said interior surface of said base, respectively, and said end surface of said cartridge more closely conforms to said protrusion to prevent rotation of the end surface of said filter cartridge about said central axis with respect to said engagement surface.

9. The filter assembly of claim 8 wherein said engagement surface of said base comprises a plurality of protrusions that are circumferentially spaced about said central axis and which extend outwardly from said engagement surface, wherein said end surface of said cartridge conforms to said protrusions upon introduction of fuel at operating pressure into said cartridge to define a plurality of complementary dimples.

10. The filter assembly of claim 9 wherein each of said dimples is distinct from each other of said dimples.

11. The filter assembly of claim 8 wherein said engagement surface of said base comprises an annular recess disposed adjacent said skirt and said assembly further comprises spring means for biasing said cartridge, said spring means being at least partially disposed in said recess.

12. The filter assembly of claim 11 wherein said spring means comprises a wave spring having oppositely disposed first and second surfaces, said first surface of said wave spring bearing on said engagement surface of said base and said second surface of said wave spring bearing on said end surface of said end portion.

13. The filter assembly of claim 8 wherein said end portion has a thickness of 0.018 to 0.024 inches.

14. The filter assembly of claim 8 wherein said engagement surface and said end surface define a clearance of 0.010 to 0.020 inches.

15. The filter assembly of claim 8 wherein said protrusion has a diameter of 0.150 to 0.750 inches.

16. A filter assembly for filtering a flow of liquid at an operating pressure of greater than 50 psi, said filter assembly comprising:

a base defining a reference receptacle structure, an annular recess disposed within said receptacle structure;

a filter cartridge having at one end portion thereof a reference container structure configured for reception by said receptacle structure, said container structure being at least semi-flexible wherein said container structure plastically deforms due to the pressure induced forces of liquid within said cartridge, so that upon mounting said cartridge to said base, said pressure induced forces cause said container structure to be drawn into a closer conformal relationship to said receptacle structure during operation; and spring means for providing a biasing said cartridge, said spring means being at least partially disposed in said recess.

17. A fuel filter assembly for filtering a flow of fuel at a system operating pressure of at least 50 psi, said filter assembly comprising:

a base comprising an engagement surface and a skirt defining a receptacle having an interior surface, said engagement surface of said base having an annular recess disposed adjacent said skirt;

a filter cartridge comprising an end portion configured for reception by said receptacle, said end portion having an end surface and an outer peripheral surface and being plastically deformable due to pressure induced forces of the flow of fuel; and spring means for biasing said cartridge, said spring means being at least partially disposed in said recess;

wherein upon mounting said filter cartridge to said base and upon circulating fuel at system operating pressure, said system operating pressure causes said end surface and said peripheral surface of said end portion to be drawn into engagement with said engagement surface and said interior surface of said base, respectively.

* * * * *